Patented Nov. 2, 1926.

1,605,202

UNITED STATES PATENT OFFICE.

SUSAN E. BAUMEISTER, OF CHICAGO, ILLINOIS.

MOTH INSECTICIDE.

No Drawing.   Application filed October 2, 1925.   Serial No. 60,102.

My invention relates broadly to an insecticide and more particularly to an insecticide for exterminating moths.

While I shall describe my invention as being particularly adaptable as an insecticide for killing moths, it will nevertheless be understood that it may be employed as an insecticide for exterminating other insects.

At the present time, various forms of moth exterminators have been devised and have been used in homes and elsewhere to prevent moths from destroying valuable garments, upholstered furniture, curtains, and other material, which moths have an avidity to destroy. I have found, however, that these moth exterminators are usually unreliable and unsatisfactory. Silks, which are often highly colored, are quickly eaten by moths. If the exterminator is not properly applied, the silk will be ruined, because the exterminator will tend to cause discoloration. Mohair used as furniture covering is also susceptible to such damage. On the other hand prior art exterminators tend to leave a peculiar and displeasing odor in the air. This is as undesirable as its discoloring tendency, because the time when it can then be used in a room is exceedingly limited.

An object of my invention is to provide an improved form of insecticide for killing moths which overcomes the disadvantages of the prior art, and which, at the same time, is more effective and of greater penetrating power, so that the mere odor thereof in a room or closet will bring about the immediate death of the moth.

A further object is to provide a moth secticide which leaves a pleasing and agreeable odor after it is distributed about the garments, the odor seeming to be that of a perfume, and therefore, of particular advantage when placed in a room or on wearing apparel.

A still further object is to provide a moth insecticide which under no circumstances can affect the color or injure the clothes or fabric.

My invention is directed particularly to an insecticide which is easy to prepare and inexpensive to manufacture.

Further objects and advantages will be apparent from the following description wherein I set forth a convenient form of my invention.

In the preparation of an insecticide embodying my invention, I prefer to use grain alcohol and oil of patchouli in suitable quantities and to mix these ingredients until thoroughly intermingled with each other, so that the oil will be, what might be termed, dissolved by the grain alcohol.

Oil of patchouli is an oil taken from the patchouli plant and has a very pleasing odor when in diluted form. The oil is diluted because very little of it is required to kill the moth. They are very susceptible to its odor and I have found where an open dish having a mixture embodying my invention is allowed to stand in a room for a short time, no steps being taken to accelerate the ordinary rate of evaporation, the small amount that will evaporate has such a penetrating effect that moths, which have never been known to be in the room, will be found dead.

The use of grain alcohol in the present instance has been found preferable, although wood alcohol and other fluids might be used. At the present time however, I have found grain alcohol to be the most effective.

Grain alcohol seems to act as a carrier for the oil of patchouli. It also acts as a solvent and places the oil of patchouli in a suitable condition for evaporation. While grain alcohol is a volatile fluid, and no doubt increases the rate of evaporation of the mixture, it also aids in rendering the oil of patchouli effective as an insecticide, and increases the value of its odors as a pleasing perfume.

While the oil of patchouli and grain alcohol may be mixed in any desired proportions, the best results have been obtained when three ounces of oil of patchouli have been mixed with a pint of grain alcohol. Different proportions have been used and have been found effective for exterminating moths.

The insecticide may be used by allowing it to evaporate from an open dish or it may be applied directly to the material in any manner, as for example, by spraying.

Grain alcohol appears to have an affinity for the oil of patchouli, because both mix with each other very well. The oil of patchouli in its diluted form with the grain alcohol is easily sprayed and does not injure fine silks and fabric when contacting therewith. Its value as a perfume in this connection is novel, because it can be used as a deodorizer as well.

I claim:

1. An insecticide comprising a mixture of oil of patchouli and a solvent carrier therefor.

2. An insecticide composition comprising oil of patchouli.

3. An insecticide adapted particularly to exterminate moths comprising a mixture of oil of patchouli and alcohol, in the proportion of three ounces of oil of patchouli to sixteen ounces of alcohol.

4. An insecticide comprising a mixture of oil of patchouli and alcohol.

In witness whereof, I have hereunto subscribed my name.

SUSAN E. BAUMEISTER.